(12) United States Patent
Brown et al.

(10) Patent No.: US 10,267,433 B2
(45) Date of Patent: Apr. 23, 2019

(54) ILLUMINATED DOME/CONICAL MIRROR VALVE POSITION INDICATION

(71) Applicant: Bray International, Inc., Houston, TX (US)

(72) Inventors: Craig Brown, Houston, TX (US); Dan Walker, Houston, TX (US); James F. Schmidt, Houston, TX (US)

(73) Assignee: Bray International, Inc., Houston, TX (US)

( * ) Notice: Subject to any disclaimer, the term of this patent is extended or adjusted under 35 U.S.C. 154(b) by 255 days.

(21) Appl. No.: 15/265,553

(22) Filed: Sep. 14, 2016

(65) Prior Publication Data

US 2017/0002954 A1 Jan. 5, 2017

Related U.S. Application Data

(63) Continuation-in-part of application No. 14/070,100, filed on Nov. 1, 2013, now Pat. No. 9,546,742, which is a continuation-in-part of application No. 29/467,357, filed on Sep. 18, 2013, now Pat. No. Des. 716,416.

(60) Provisional application No. 61/721,123, filed on Nov. 1, 2012.

(51) Int. Cl.
*F16K 37/00* (2006.01)

(52) U.S. Cl.
CPC ...... *F16K 37/0058* (2013.01); *F16K 37/0041* (2013.01); *F16K 37/0083* (2013.01); *Y10T 137/0318* (2015.04); *Y10T 137/8242* (2015.04)

(58) Field of Classification Search
CPC .. F16K 37/00; F16K 37/0008; F16K 37/0041; F16K 37/0058; F16K 37/0083; Y10S 116/21; Y10T 137/8225; Y10T 137/8242; Y10T 137/8275; Y10T 137/0318; F21V 3/02; F21Y 2101/02
USPC ......... 116/277, DIG. 21; 137/553, 554, 556; 362/23.14, 23.19, 23.2
See application file for complete search history.

(56) References Cited

U.S. PATENT DOCUMENTS

2007/0205232 A1* 9/2007 Doyle ............... C02F 1/008
                                                    222/544

* cited by examiner

*Primary Examiner* — Lisa M Caputo
*Assistant Examiner* — Irving A Campbell
(74) *Attorney, Agent, or Firm* — Oathout Law Firm; Mark A. Oathout; Laura Tu

(57) ABSTRACT

A valve in conjunction with an actuator has a valve position indicator coupled to the actuator. The valve position indicator has an indicator cover mounted over an indicator mounting surface, an array of LED lights arranged on the indicator mounting surface, and a mirror mounted internal and concentric to the indicator cover. A sensor in communication with the actuator and the plurality of LED lights communicates the position of the valve to the plurality of LED lights. The plurality of LED lights may illuminate to indicate an incremental degree that the valve is open, if any, and/or indicate by color the direction that the opening (or respective closing) of the valve is changing. In another embodiment with or without the mirror equiangular spaced single points of light each have one high intensity LED oriented to emit light horizontally and one high intensity LED oriented to emit light vertically.

18 Claims, 15 Drawing Sheets

ILLUMINATED DOME/CONICAL MIRROR VALVE POSITION INDICATION

STATEMENTS REGARDING FEDERALLY SPONSORED RESEARCH OR DEVELOPMENT

Not applicable

NAMES OF THE PARTIES TO A JOINT RESEARCH AGREEMENT

Not applicable

BACKGROUND

Valves may be used in a number of applications to control the flow of fluids through piping systems. There are several different types of valves used for controlling flow such as ball valves, gate valves, butterfly valves, needle valves, check valves, and the like. Ball valves, butterfly valves, needle valves and gate valves may be actuated with an actuator, a manual hand wheel, or manual lever between the open and closed position. It may be difficult to know the position of the valve from the location of the actuator (for example, the hand wheel or power actuator). Therefore a need exists for an improved valve position indicator for use with valves. There is a further need for a valve indicator that better communicates the position of the valve through the display.

SUMMARY

A valve in conjunction with an actuator has a valve position indicator coupled to the actuator. The valve position indicator has an indicator cover mounted over an indicator mounting surface, an array of LED lights arranged on the indicator mounting surface, and a mirror mounted internal and concentric to the indicator cover. A sensor in communication with the actuator and the plurality of LED lights communicates the position of the valve to the plurality of LED lights. The plurality of LED lights may illuminate to indicate an incremental degree that the valve is open, if any, and/or indicate by color the direction that the opening (or respective closing) of the valve is changing. In another embodiment with or without the mirror equiangular spaced single points of light each have one high intensity LED oriented to emit light horizontally and one high intensity LED oriented to emit light vertically.

As used herein the term LED (or L.E.D.) shall mean light-emitting diode and/or any similar type light emitting device.

DETAILED DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
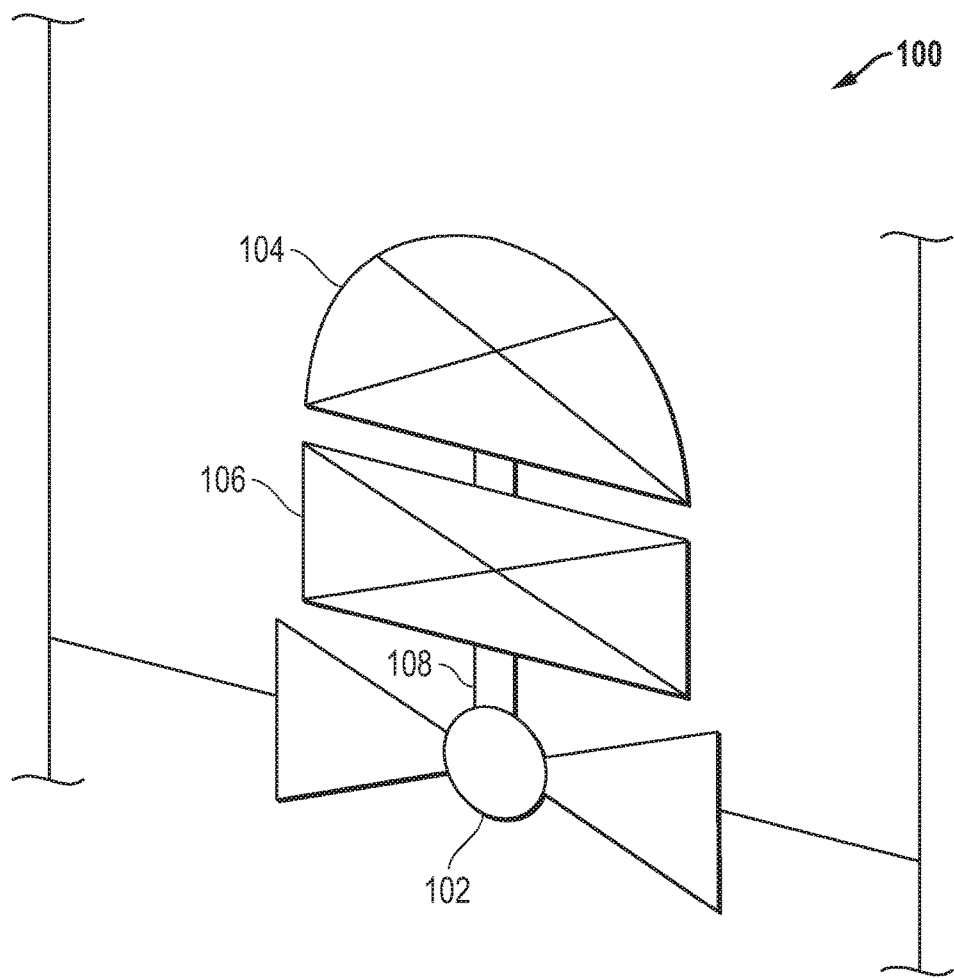
FIG. 1 depicts a schematic of a piping system having a valve with a valve position indicator.

FIG. 1 depicts a schematic view of a piping system 100 having a valve 102 with a valve position indicator 104 according to an embodiment. The piping system 100 may be any suitable piping system that requires the control of flow within the piping system 100. The valve 102 may have an actuator 106 configured to move the valve 102 between an open and a closed position. The actuator 106 may be any suitable actuator including, but not limited to, a pneumatic actuator, a hydraulic actuator, an electric actuator, a hand wheel, a lever, and the like. The actuator 106 may have an actuator shaft 108 configured to manipulate the valve position indicator 104 as the valve 102 moves between the open and closed position as will be discussed in more detail below. The actuator shaft 108 may be configured to move the valve 102 between the open and closed position, or be a separate shaft that moves as the valve 102 moves between the open and closed position.

Figure 2:
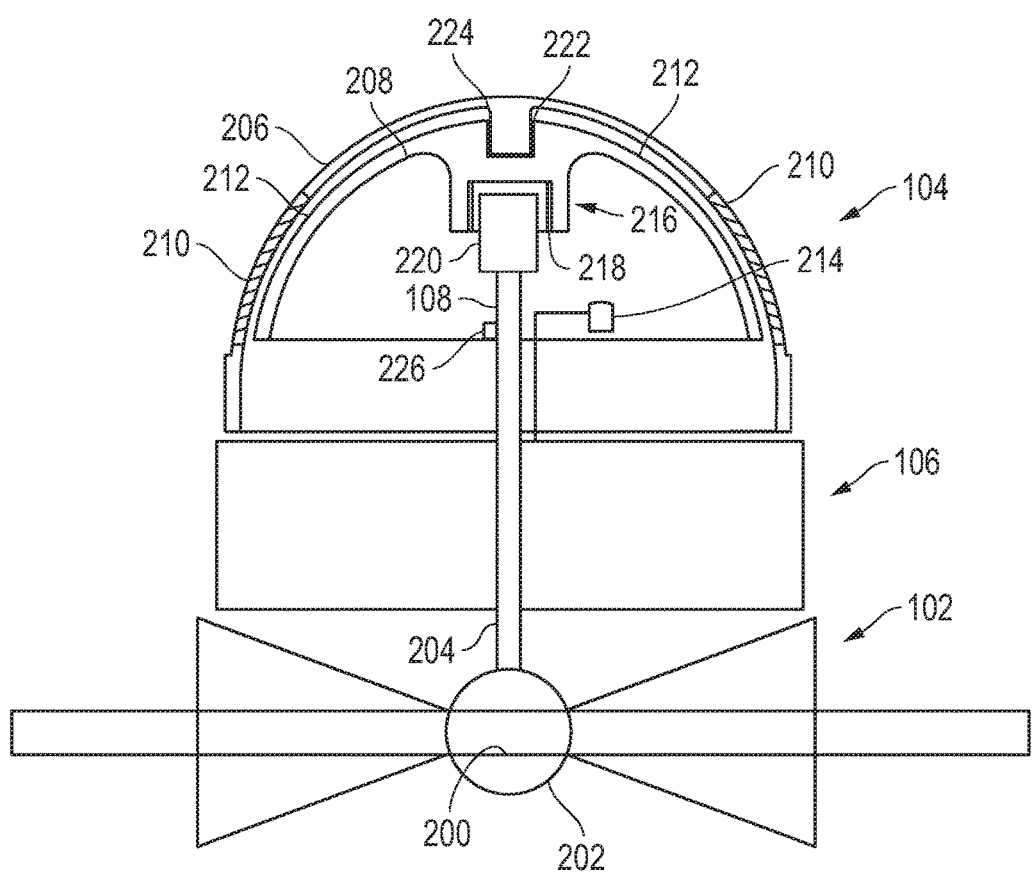
FIG. 2 depicts a cross-sectional view of the valve and the valve position indicator of FIG. 1 according to an embodiment.

FIG. 2 depicts a schematic view of the valve 102 and a cross sectional view of the valve position indicator 104. The valve 102 as shown is a ball valve having a bore 200 in an open position. In the open position, the bore 200 of the valve 102 may align with the bore of the piping system 100. The actuator 106 may be configured to move a ball 202 of the valve 102 between the open position and the closed position wherein the bore 200 is not aligned with the bore of the piping system 100. A valve stem 204 may be rotated by the actuator 106 in order to move the valve 102 between the open and closed position. The valve stem 204 may be integral with the actuator shaft 108 as shown, or a separate gear or mechanism may actuate the actuator shaft 108 with the valve stem 204. Although the valve 102 is described as a ball valve, the valve 102 may be any suitable valve including, but not limited to, a butterfly valve, a needle valve, a gate valve and the like.

The actuator 106 may be any suitable actuator for actuating the valve 102 including, but not limited to, a pneumatic actuator, a hydraulic actuator, an electric actuator, a hand wheel, a lever and the like.

The valve position indicator 104, as shown, rests above the actuator 106. Although the valve position indicator 104 is shown directly above the actuator 106, the valve position indicator 104 may be in any suitable location and/or side (such as, for example, mounted to the indicator mounting surface 107 of the actuator 106) so long as the actuator shaft 108 may actuate the valve position indicator 104 as will be discussed in more detail below. The valve position indicator 104 may include, but is not limited to, an indicator cover 206, a rotor 208, one or more windows 210 in the indicator cover 206, one or more indicator surfaces 212 on the rotor 208, a light source 214 (or lamp), and an actuator shaft connector 216. The actuator shaft 108 may rotate the rotor 208 as the valve 102 moves between the open and closed position. As the rotor 208 moves, the one or more indicator surfaces 212 may align with the one or more windows 210 thereby indicating the position of the valve 102.

The actuator shaft 108 may secure to the rotor 208 at the actuator shaft connector 216. As shown, the actuator shaft connector 216 has a female end 218 configured to receive a male end 220 of the actuator shaft 108. The female end 218 and/or male end 220 may be splined and/or shaped to allow the rotational transfer or torque between the actuator shaft 108 and the rotor 208 in an embodiment. In another embodiment, the actuator shaft 108 may be integral with or couple to the rotor 208 with a pin (not shown).

The indicator cover 206 and the rotor 208 are shown as being dome shaped. The dome of the rotor 208 may nest within the dome of the indicator cover 206. Although the indicator cover 206 and the rotor 208 are shown as arcuate domes it should be appreciated that they may have any suitable shape including cylindrical (inverted cup-shaped), conical, elliptical (any ellipse rotated about its central axis), geodesic domes and the like.

A rotor 208 may have an alignment hub 222 configured to receive a pin 224 on the indicator cover 206. With the pin 224 in the alignment hub 222, the indicator cover 206 may be positioned substantially symmetrical over the rotor 208. The alignment hub 222 may be free to rotate relative to the pin 224 as the actuator shaft 108 rotates the rotor 208. The indicator cover 206 may be coupled directly to the actuator 106, or another portion of the valve 102 in order to prevent the indicator cover 206 from rotating with the rotor 208.

Figures 3A, 3B:
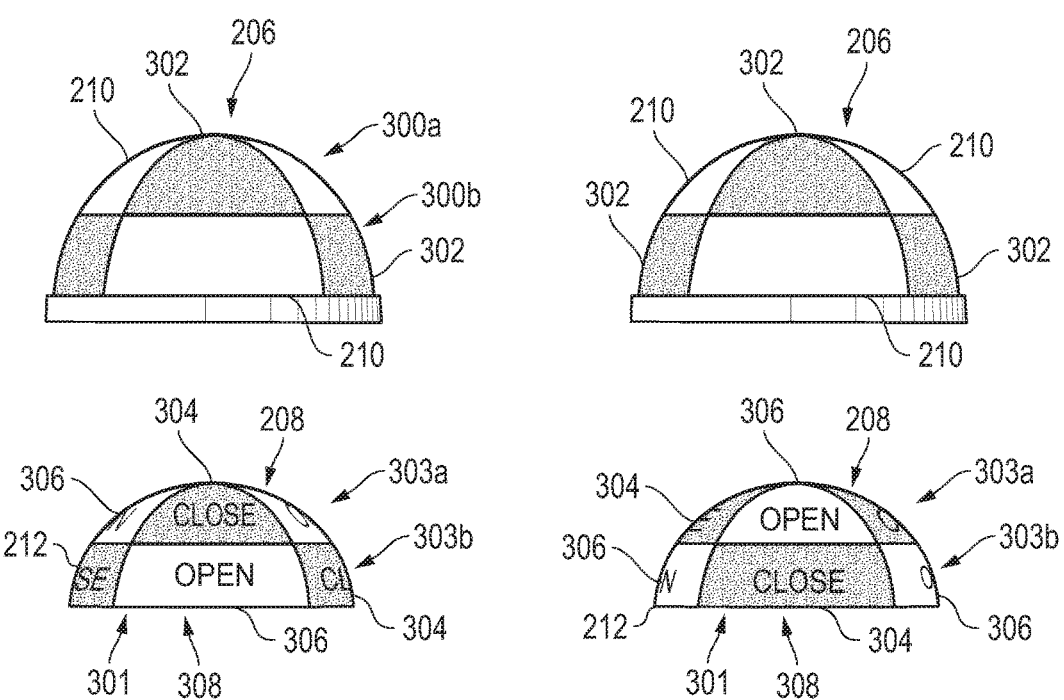
FIG. 3A depicts an exploded side view of the valve position indicator according to an embodiment.
FIG. 3B depicts an exploded side view of the valve position indicator according to an embodiment.

FIG. 3A depicts an exploded side view of the indicator cover 206 and the rotor 208. The indicator cover 206 as shown has two rows 300 of windows 210 for viewing the indicator surfaces 212: a top row 300a having two windows 210 directly opposite one another and a bottom row 300b having two windows 210 directly opposite one another. Between the windows 210 is a panel 302. The panel 302 may be solid (not transparent). In one embodiment, the panel 302 may have a black color, or shade. Although the panel 302 is described as being a black color, it should be appreciated that the panel 302 may be any color so long as it is not transparent.

The rotor 208 may have two indicator rows 303 that align with the row 300 of the indicator cover 206 when the rotor 208 is nested in the indicator cover 206. The indicator surfaces 212 may have one or more position indicators 301 which may be further designated as one or more closed indicators 304, and/or one or more open indicators 306. As shown, the rotor 208 has two closed indicators 304 on the top indicator row 303a (appearing with a dome shape overlaid on a spherical surface as viewed in FIG. 3A) and two closed indicators 304 on the bottom indicator row 303b (appearing with a trapezoid-like shape overlaid on a spherical surface as viewed in FIG. 3A). The rotor 208 may have two open indicators 306 on the top indicator row 303a (appearing with a dome shape overlaid on a spherical surface as viewed in FIG. 3B) and two open indicators 306 on the bottom indicator row 303b (appearing with a trapezoid-like shape overlaid on a spherical surface as viewed in FIG. 3B). The open indicators 306 and the closed indicators 304 may have the same pattern as the windows 210 and panels 302 of the indicator cover 206. Although there are four panels 302 and four windows 210 on the indicator cover 206 that align with four open indicators 306 and four closed indicators 304 on the rotor 208, it should be appreciated that any number of panels 302, windows 210, open indicators 306 and closed indicators 304 can be used so long as the indicator surfaces 212 align with the windows 210 and panels 302 to clearly display the open position or the closed position.

When the valve 102 is in the closed position, the closed indicator 304 is aligned with the window 210 thereby displaying the closed indicator 304 through the window 210. The closed indicators 304 may have a word indicating the closed position. As shown, the closed indicator 304 has the word "CLOSE" on the surface of the closed indicator 304. Although the word is shown as "CLOSE", it should be appreciated that any suitable word and/or symbol may be used to indicate the closed position (by way of example, the position indicator term 308 for the closed indicator 304 may be "CLOSED" or "NOT FLOWING"). In addition to or as an alternative to the word indicator, the closed indicators 304 may have a color coating. In one embodiment, the closed indicator 304 may be a red color. Although the closed indicator 304 is described as red in one embodiment, it may be any suitable color (by way of example, the closed indicator 304 could be blue or green).

When the valve 102 is in the open position, the open indicator 306 is aligned with the window 210 thereby displaying the open indicator 306 through the window 210. The open indicators 306 may have a word indicating the open position. As shown, the open indicator 306 has the word "OPEN" on the surface of the open indicator 306. Although the word is shown as "OPEN", it should be appreciated that any suitable word and/or symbol may be used to indicate the open position (by way of example, the position indicator term 308 for the open indicator 306 may be "OPENED" or "FLOWING"). In addition to or as an alternative to the word indicator, the open indicators 306 may have a color coating. In one embodiment, the open indicator 306 may be a yellow color. Although the open indicator 306 is described as yellow in one embodiment, it may be any suitable color (by way of example, the open indicator 306 could be blue or green so long as its color is distinguishable from the color of the closed indicator 304).

FIG. 3A shows the rotor 208 positioned in the open position if it were nested in the indicator cover 206. In the open position the four open indicators 306 align with the windows 210 of the open indicator 306. The rotor 208 will stay in the open position displaying the open indicators 306 through the window 210. In this position, the closed indicators 304 are located under the panels 302, thereby blocking the view of the closed indicators 304. The rotor 208 will stay in the open position until the valve 102 is moved to the closed position. The valve 102 will remain in the open position until the valve is closed.

FIG. 3B shows the rotor 208 positioned in the closed position if it were nested in the indicator cover 206. In the closed position the four closed indicators 304 align with the windows 210 of the closed indicator 304. In this position, the open indicators 306 are located under the panels 302, thereby blocking the view of the open indicators 306.

The valve position indicator 104 may have the light source 214 as shown in FIG. 2 that illuminates the interior of the rotor 208. The rotor 208 may be made of a semi translucent material that allows the light to pass through the rotor 208. The light may illuminate the open indicators 306 and the closed indicators 304. The illumination may allow the open indicator 306 or the closed indicator 304 to be illuminated when they are aligned with the windows 210. The illumination may allow the open indicator 306 and the closed indicator 304 to be seen easily by an operator and/or worker on the valve 102. The light source 214 may be any suitable light source including, but not limited to, a light emitting diode (LED), a florescent light, an incandescent light bulb, and the like. The light source 214 may be a clear light or a colored one. By way of example, one such embodiment of a light source 214 may be a three-wire LED where powering first and second wires emits one color (e.g. a yellow light), and powering first and third wires emits a second color (e.g. a red light). Various different colored light(s) and options for different colors may be implemented.

The wording "OPEN" and/or "CLOSE" may be omitted in the entirety from the valve position indicator 104 such that color (and optionally sound) may be used exclusively to indicate positioning of the valve through the closed and open indicators 304 & 306. Or, The wording "OPEN" and/or "CLOSE" plus the closed and open indicators 304 & 306 may be omitted in the entirety from the valve position indicator 104 such that the entire valve position indicator 104 (dome as the case may be) illuminates only one given color at any moment in time to indicate valve position (by way of example only, the color red illuminating the entire dome indicating "close", the color "green" indicating "open", and the color "yellow" indicating transitioning with the option to include flashing colors for communication as well). In the later example, it is possible to eliminate the rotor 208, and use a light source(s) 214 only in combination with the indicator cover 206.

Figure 4:
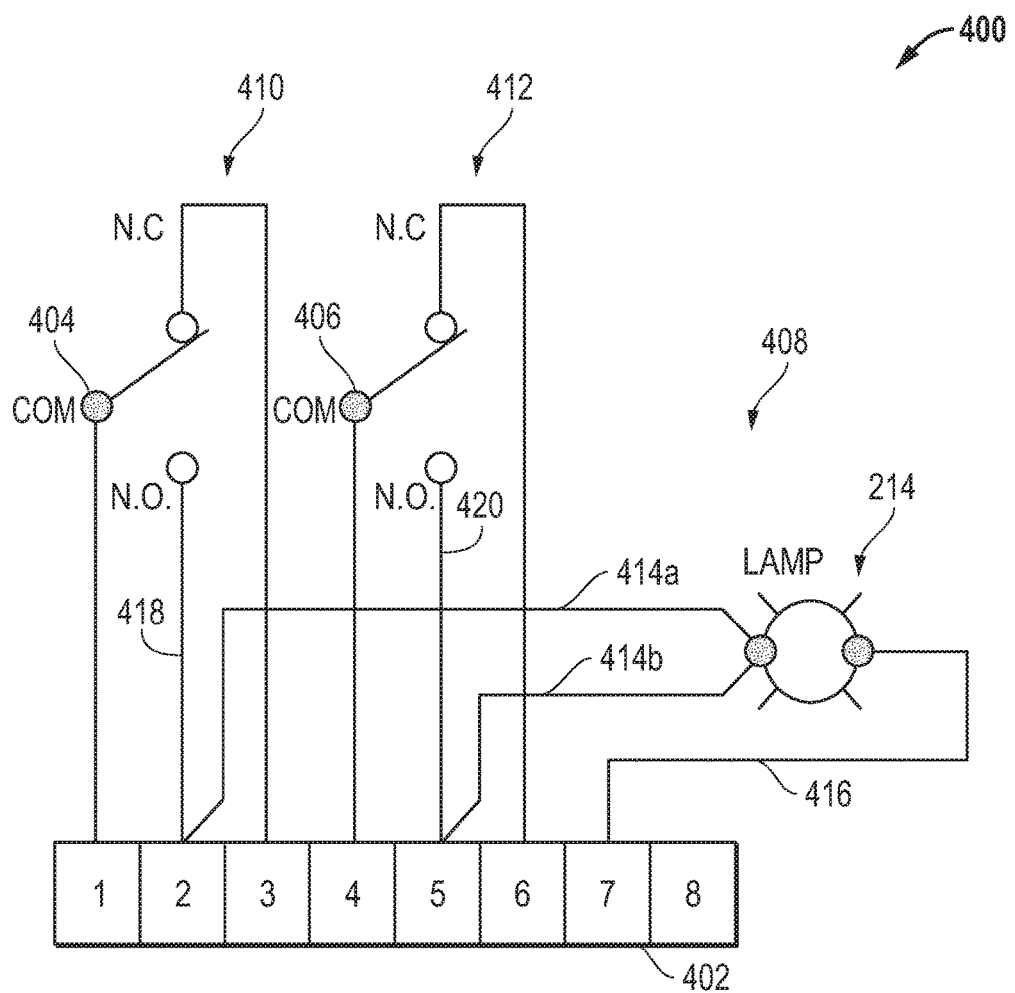
FIG. 4 depicts a wiring diagram for operating an indication lamp of the valve position indicator according to an embodiment.

FIG. 4 depicts a wiring diagram 400 for the light source 214 of the valve actuator according to an embodiment. The wiring diagram 400 depicts a terminal block 402, an open switch 404, a close switch 406, a lamp circuit 408, an open circuit 410, and a close circuit 412. The lamp circuit 408 is connected to the terminal block 402 at position (2), position (5) and position (7). The lamp circuit 408 has two supply legs 414a and 414b from position (2) and position (5) respectively to the light source 214. The lamp circuit 408 has a return leg 416 returning to position (7) of the terminal block 402. As shown, the open circuit 410 is connected to the terminal block 402 at position (1), position (2), and position (3). When the open switch 404 is in the off position, as shown, the open circuit 410 may be supplied from position (1) and returned to position (3). When the open switch 404 is in the on position, the open switch 404 is connected to an open switch return leg 418 that is connected to position (2) of the terminal block 402 that in turn supplies the supply leg 414a thereby lighting the light source 214. As shown, the close circuit 412 is connected to the terminal block 402 at position (4), position (5), and position (6). When the close switch 406 is in the off position, as shown, the close circuit 412 may be supplied from position (4) and returned to position (6). When the close switch 406 is in the on position, the close switch 406 is connected to a close switch return leg 420 that is connected to position (5) of the terminal block 402 that in turn supplies the supply leg 414b thereby lighting the light source 214. It should be appreciated that any suitable circuit to operate the light source 214 may be used.

Figure 5:
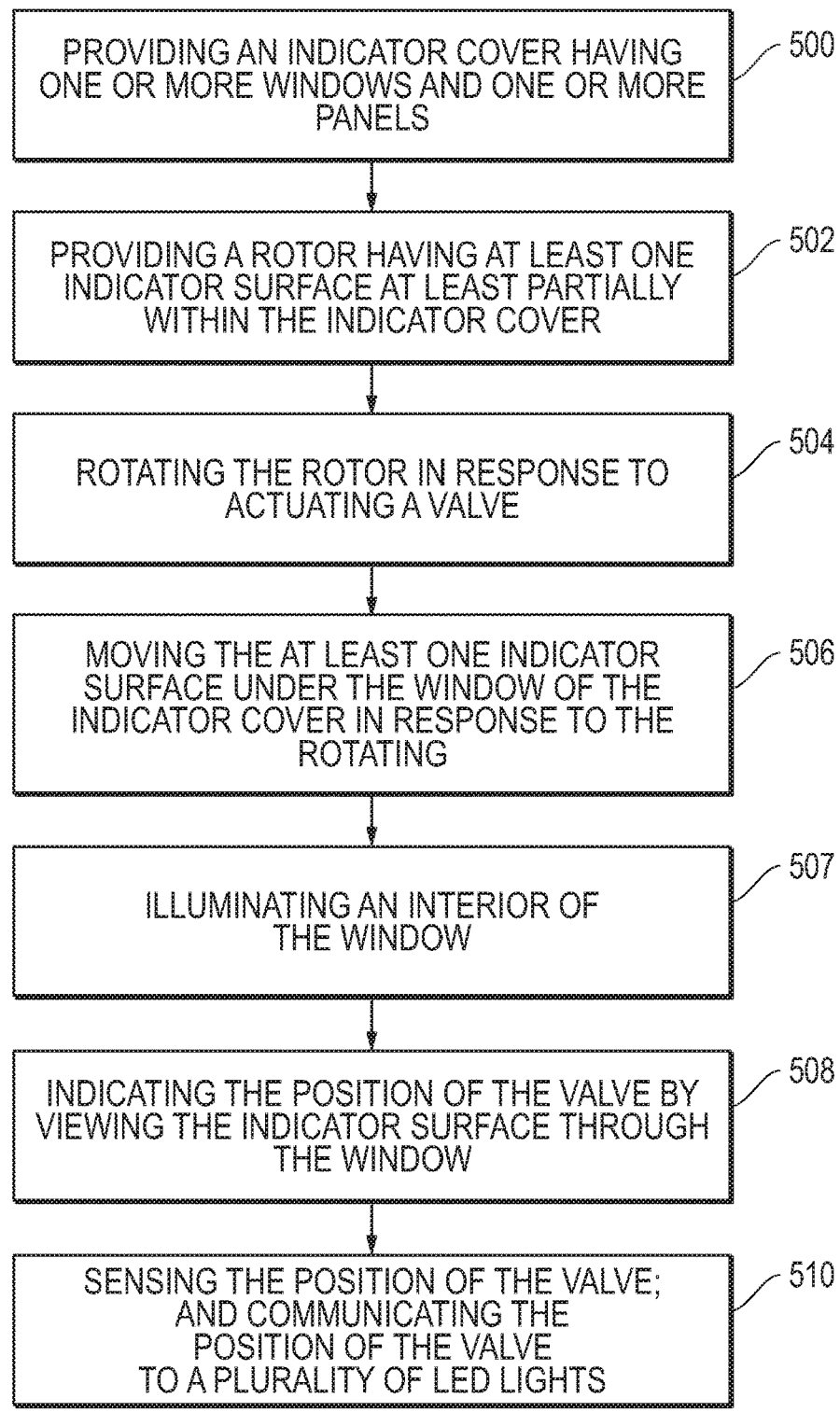
FIG. 5 is a flowchart depicting a method for operating the valve position indicator in an embodiment.

FIG. 5 depicts a flowchart depicting a method for operating the valve position indicator 104 in an embodiment. The flowchart begins at block 500 wherein an indicator cover is provided having one or more windows and one or more panels. The flowchart continues at block 502 wherein a rotor is provided having at least one indicator surface at least partially within the indicator cover. The flowchart continues at block 504 wherein the rotor is rotated in response to actuating a valve. The flowchart continues at block 506 wherein the at least one indicator surface moves under the window of the indicator cover in response to the rotating. The flowchart continues at block 507 wherein the interior of the window is illuminated. The flowchart continues at block 508 wherein the position of the valve is indicated by viewing the indicator surface 212 through the window. The flowchart may continue at block 510 wherein the position of the valve can be sensed and communicated to a plurality of LED lights.

Figure 6:
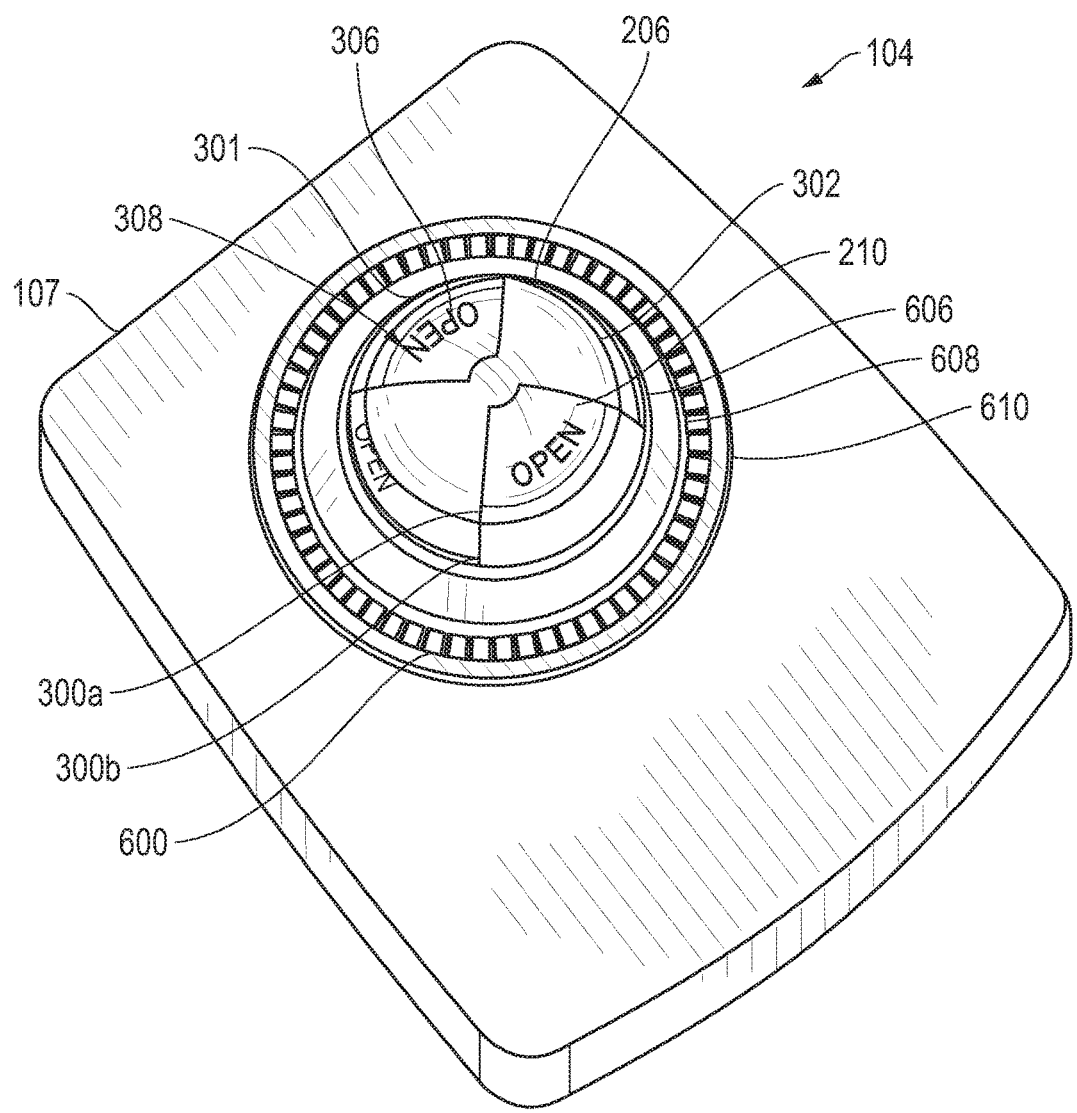
FIG. 6 depicts a perspective view of a valve position indicator according to an alternative embodiment.
Figure 7B:
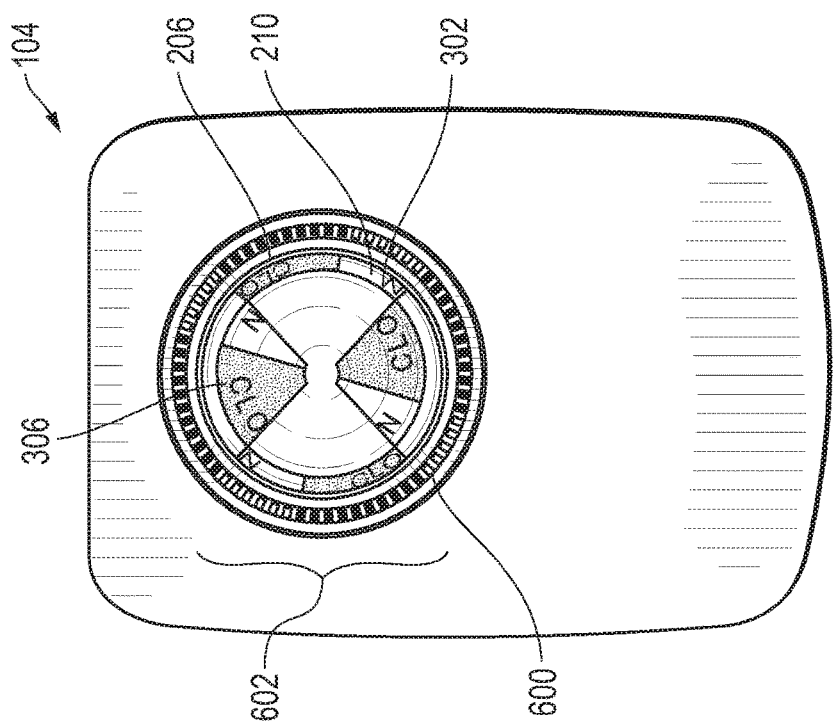
FIG. 7B depicts a view similar to FIG. 7A except showing the valve in a different position.
Figure 7A:
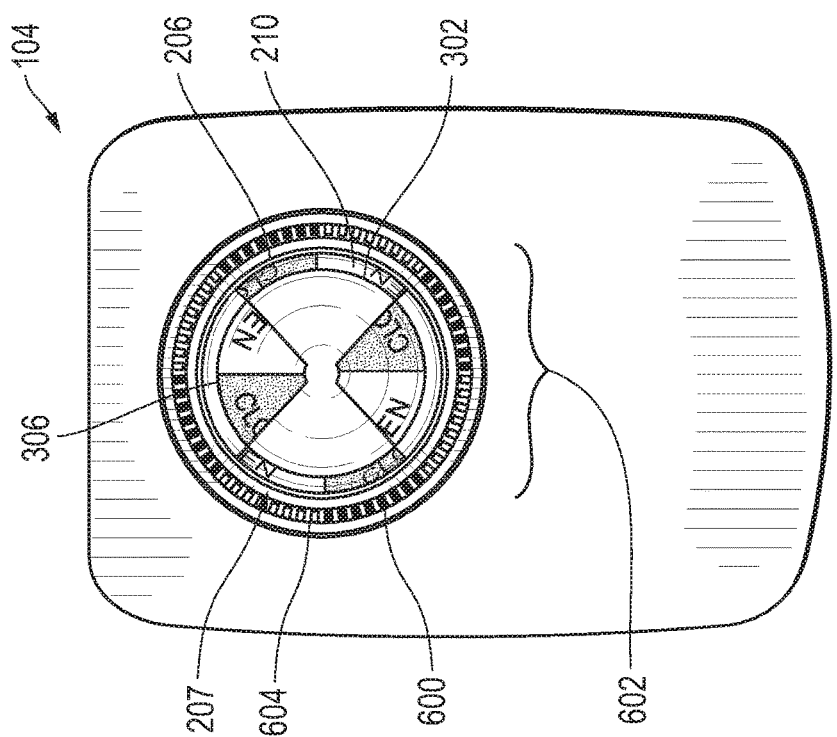
FIG. 7A depicts a top view of a valve position indicator according to an alternative embodiment.

FIG. 6 depicts a perspective view of a valve position indicator according to an alternative embodiment in an open position. The embodiment depicted in FIG. 6 includes a row or array of LED lights 600 arranged in a concentric circle or ring on the indicator mounting surface 107 around and bordering the rim or perimeter 207 of the indicator cover 206. As seen in FIGS. 7A and 7B, the circle of LED lights 600 may be further subdivided into any number of sections 602 to demonstrate the valve position. The sections 602 may align with the panels 302 and windows 210 of the indicator cover 206. As seen in FIGS. 7A and 7B, the LED lights 600 comprise four sections 602 of 90°, to align with the two panels 302 and two windows 210 on the bottom indicator row 300b of the indicator cover 206. It is to be appreciated that the disclosure encompasses embodiments comprising different combinations of numbers of panels 302, windows 210, and sections 602.

The LED lights 600 also participate in visually indicating the valve position through illumination in combination with or complementary to the embodiment depicted in FIG. 2 (although such features may also be implemented independent of or without the indicator cover 206 and rotor 208). Specifically, the LED lights 600 can easily indicate the gradual increment, percentage, amount, or degree by which valve 102 is open through a combination of illuminated LEDs, un-illuminated LEDs, and/or different color LEDs. The gradual increment, percentage, amount, or degree that valve 102 is open may be communicated by a sensor 226 (see FIG. 2 for example) located on, proximate or near the actuator shaft 108. By way of example only, and as depicted in FIG. 7A, if the valve 102 (i.e. and actuator shaft 108) is halfway or fifty percent open, then fifty percent, or 45° of the contiguous lights of the 90° in section 602 of LED lights 600 may be illuminated (via sensor 226 providing a signal to the array of LED lights 600), and 45° of the remainder of each section 602 would not be illuminated. If the valve 102 is fully open, as is depicted in FIG. 6, the entire circle of LED lights 600 would be illuminated; if the valve 102 is fully closed, the entire circle of LED lights 600 would not be illuminated (or may be illuminated in as alternative color, such as, for example, red).

In addition, and as another example depicted in FIG. 7B, if the circle of LED lights 600 were to be divided into four sections 602 of 90° and the valve 102 were one-third open, then one-third, or 30° of each subsection of the LED lights 600 would be illuminated, and 60° of each subsection of the LED lights 600 would not be illuminated. Alternatively, illumination of the LED lights 600 may be used to indicate the increment, percentage, amount, or degree by which the valve 102 is closed, and the number of un-illuminated LED lights 600 may be used to indicate the degree by which the valve 102 is open.

Further, circle of LED lights 600 may consist of two indicator colors, where a first color may indicate the amount that the valve 102 is open, and the second color may indicate the amount that the valve 102 is closed. By way of example only, a green illuminated color may indicate an incremental open position, and a red illuminated color may indicate an incremental closed position. The LED lights 600 may be clear or of any illuminated color. In addition, the LED lights 600 function in conjunction with the position indicators 301, position indicator terms 308 and/or light source 214 to show the valve position.

The row or array of LED lights 600 as shown are a plurality of equidistantly spaced panes 604 arranged in a continuous concentric circle or ring around and bordering the rim or perimeter 207 of the indicator cover 206. However, the row or array could be less than completing an entire circle or ring, for example, running only in arcs of ninety degrees in two sets. The panes 604 as shown are rectangular although they could be another shape (e.g., square, round, etc.). The panes 604 could be flush, raised, crowned, or bulbous relative to the indicator mounting surface 107. The pane(s) 604 could be a single unitary strip pane of annular, "C"-shape, tapered spiral, linear (all not shown) or other shape mounted on the indicator mounting surface 107 bordering the rim or perimeter 207 of the indicator cover 206.

The indicator mounting surface 107 may include ridge(s) 606, 608 and plateau(s)/furrow(s) 610 as part of a clamping/clasping mechanism for retention of the indicator cover 206, to raise or enhance the visibility panes 604, and/or simply to enhance the appearance of the valve position indicator 106. First ridge 606 may be taller than second ridge 608.

Figure 8:
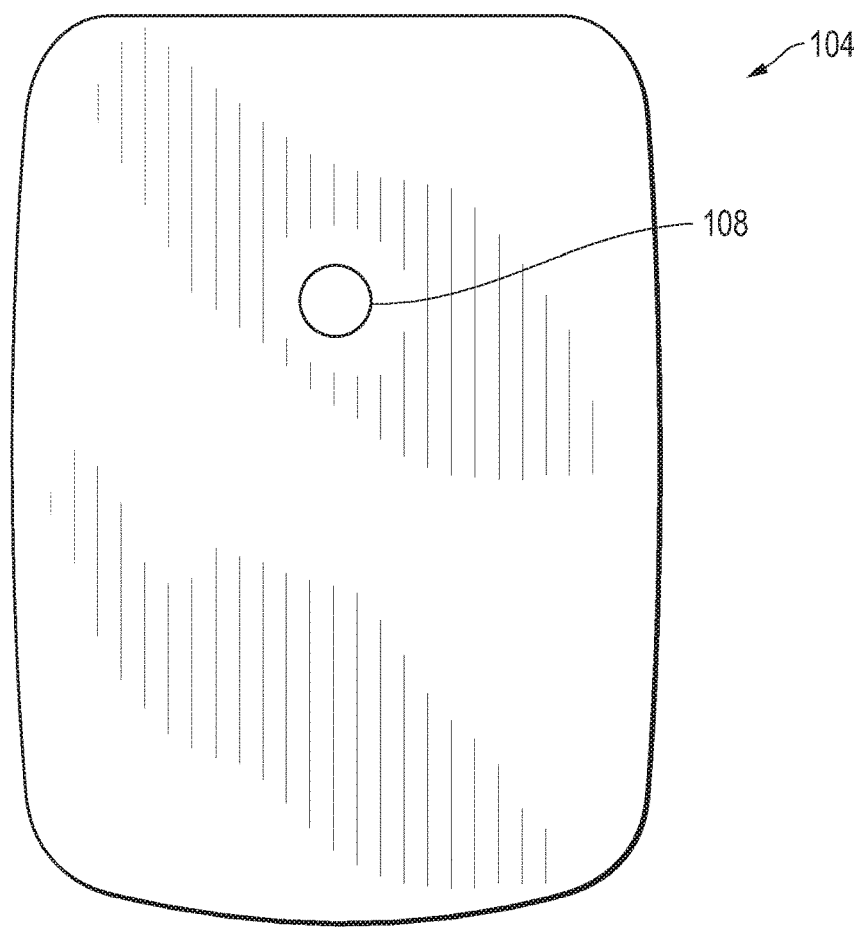
FIG. 8 depicts an underside view of the valve position indicator according to an embodiment.
Figure 9:
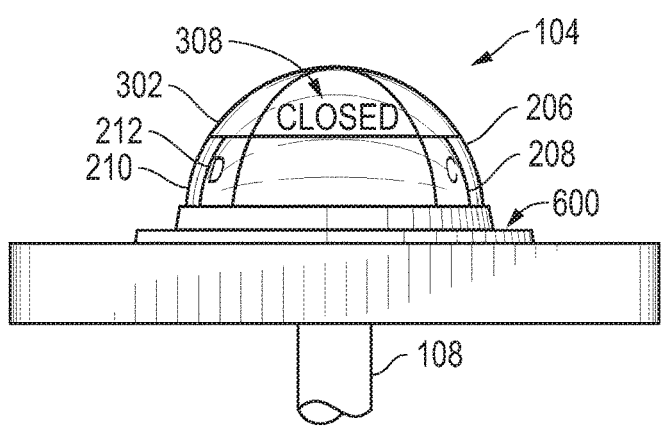
FIG. 9 depicts a front view of the valve position indicator in the "CLOSED" position according to an embodiment.

FIG. 8 depicts an underside view of the valve position indicator 104 and FIG. 9 depicts a front view of the valve position indicator 104 in the "CLOSED" position according to an embodiment. FIGS. 8 and 9 together illustrate the actuator shaft 108 in relation to the other features of valve position indicator 104. Note that the actuator shaft 108 preferably rests directly beneath the indicator cover 206 and rotor 208. The actuator shaft 108 is connected to the valve position indicator 104 at one end through an actuator shaft connector 216 (see FIG. 2) and actuates the rotor 208 to display one or more indicator surfaces 212. At the other end, the actuator shaft 108 is connected to the valve 102 (see FIG. 1). When valve 102 changes position between an open and closed position, the actuator shaft 108 relays or communicates the change to the valve position indicator 104, and the position is displayed by the indicator surfaces 212 and/or LED lights 600.

Figure 10:
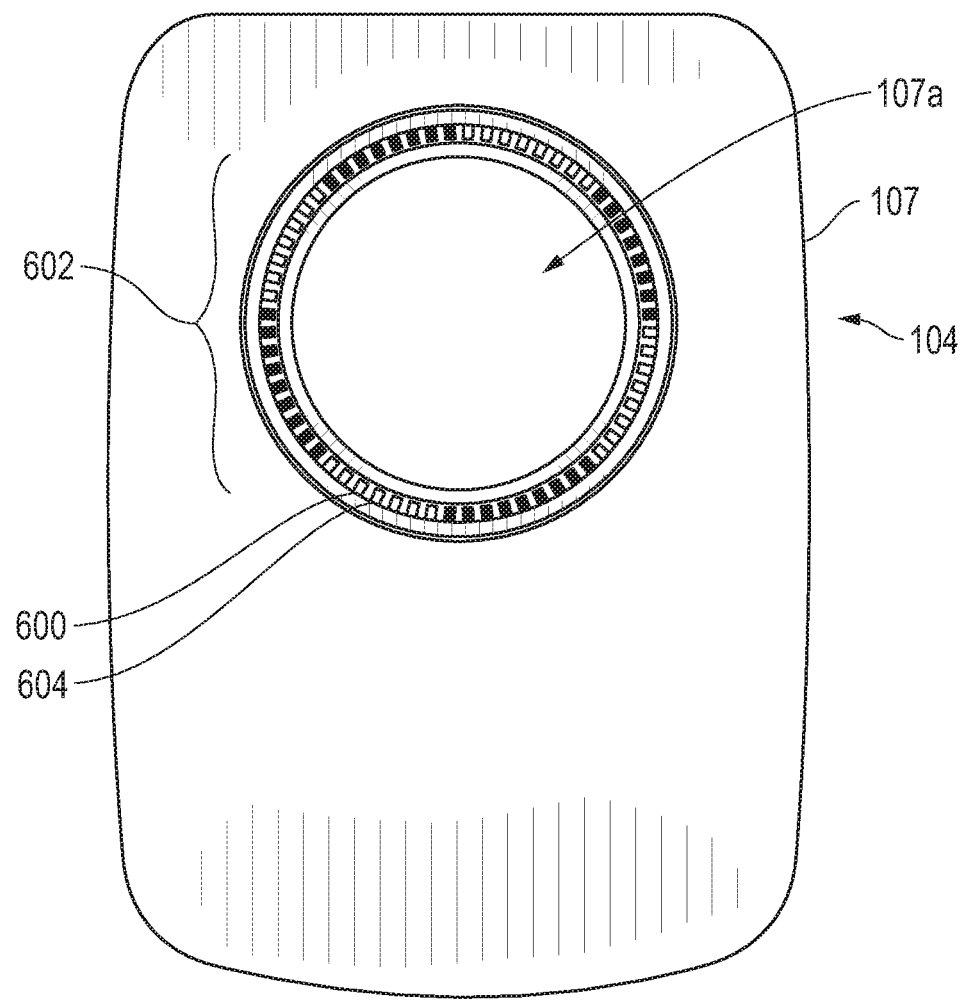
FIG. 10 depicts a top view of another embodiment of the valve position indicator.

FIG. 10 depicts a top view of another embodiment of the valve position indicator 104. The valve position indicator 104 in FIG. 10 has a circle of LED lights 600 divided into four sections 602 which are set on top of indicator mounting surface 107. However, in the embodiment envisioned in FIG. 10, the embodiment does not have an indicator cover 206 or rotor 208 on the center of indicator mounting surface 107a (i.e. the center of the indicator mounting surface 107a is simply a continuation of the indicator mounting surface 107 as bounded or divided by the array of LED lights 600 arranged in a circle or annular ring). Rather, the indication of the valve 102 position is communicated to the viewer by the illumination of the circle of LED lights 600 without the aid of the dome-shaped indicator cover 206, rotor 208, and/or indicator terms 308. The valve 102 depicted in FIG. 10 is at half-open and half-close position, which is illustrated in the illumination of each section 602. Within each section 602, 50% of the panes 604 of the LED lights 600 are illuminated a first color to communicate an open position, and 50% of the panes 604 of LED lights 600 are un-illuminated (or alternatively, illuminated a second color) to communicate a closed position. Although four sections 602 are illustrated in the embodiment, it is to be appreciated that any number of sections 602 may be utilized to communicate the position of the valve 102 to the observer of the valve position indicator 104.

Figure 11:
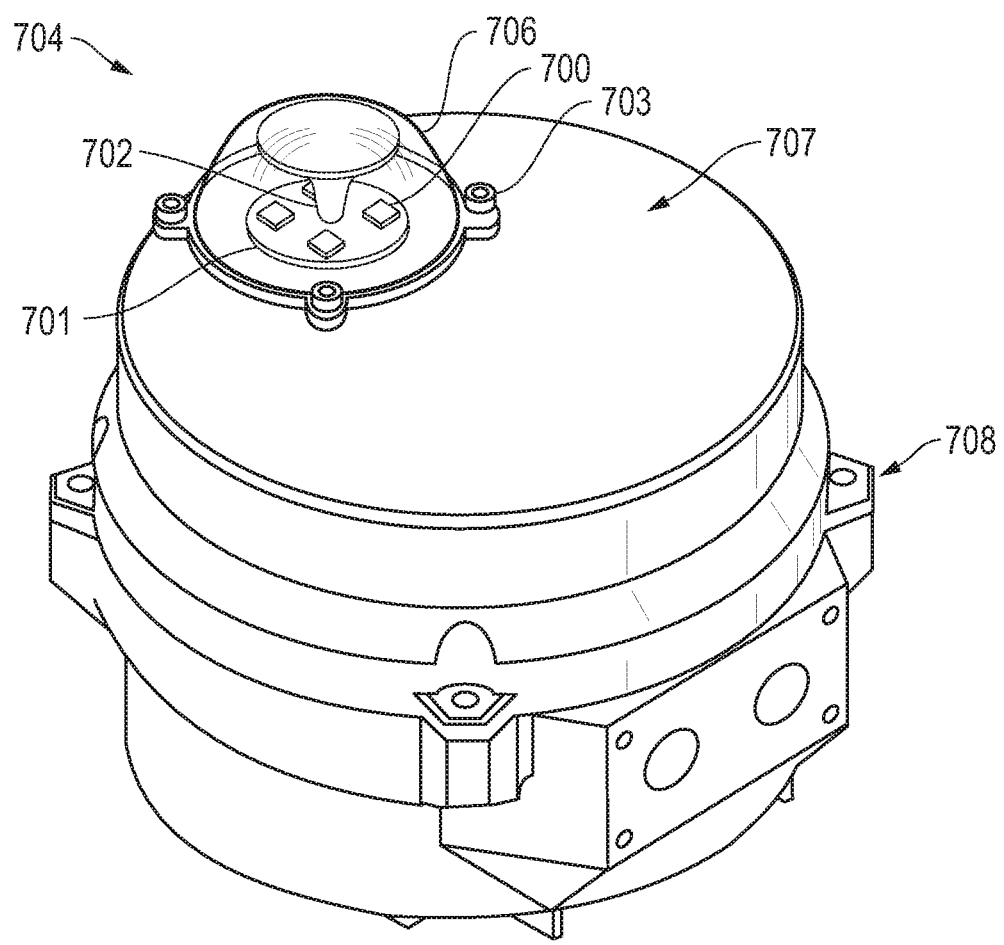
FIG. 11 depicts a perspective view of an alternative embodiment of the valve position indicator having a mirror and mounted on an actuator.
Figure 12:
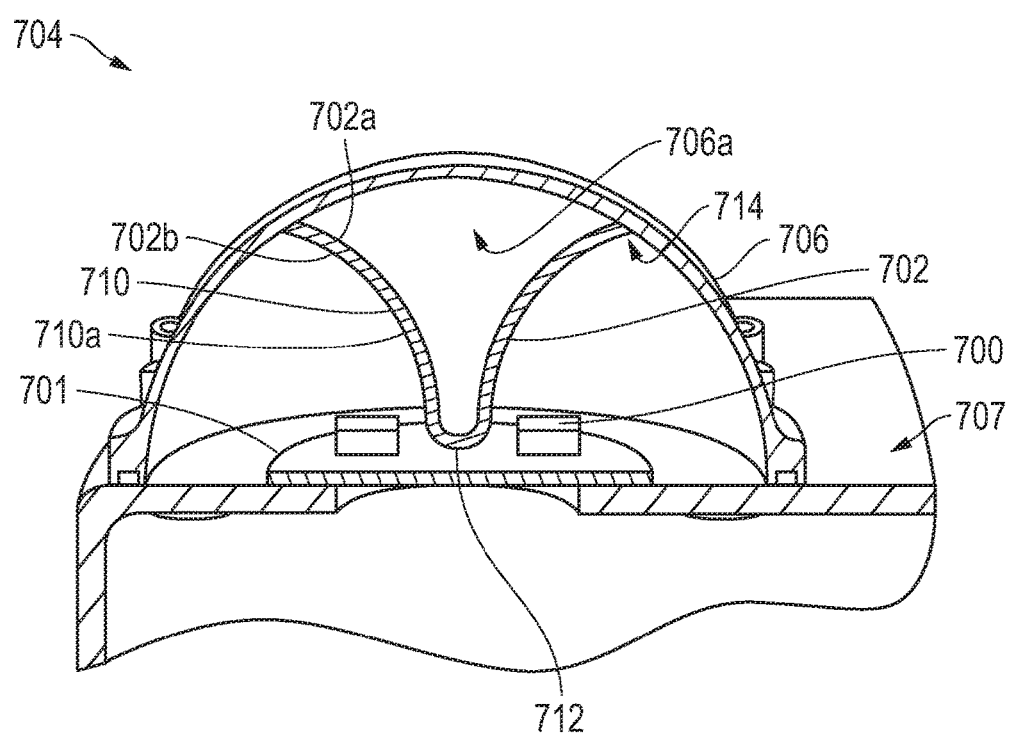
FIG. 12 depicts a cross section perspective view of the embodiment of the valve position indicator shown in FIG. 11.
Figure 13:
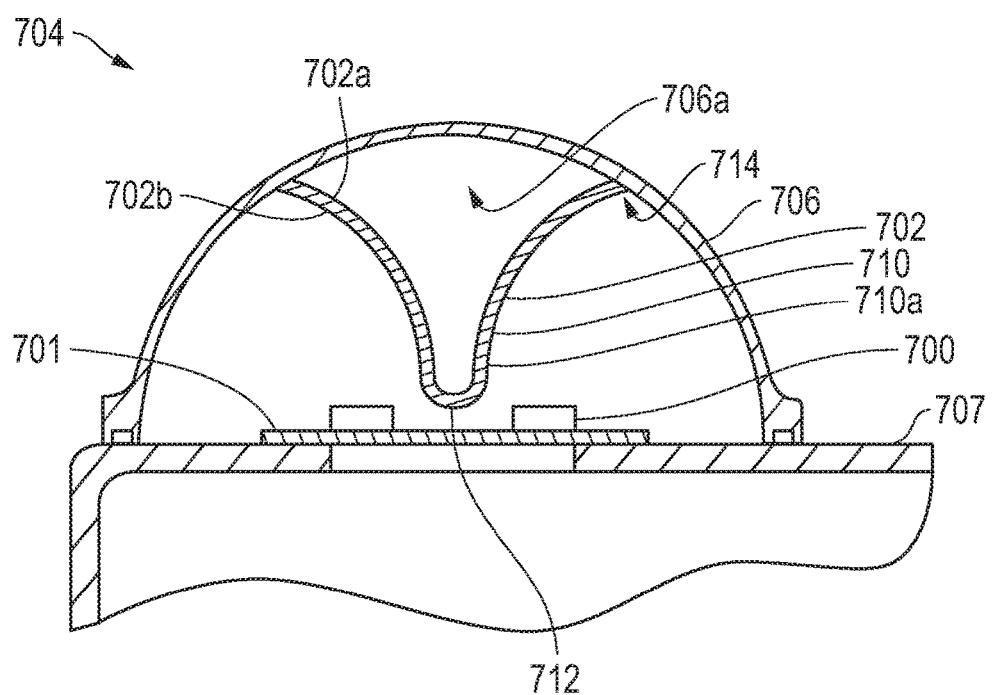
FIG. 13 depicts an elevation view in cross section of the embodiment of the valve position indicator shown in FIGS. 11-12.

FIG. 11 depicts a perspective view of an alternative embodiment of a valve position indicator 704. FIGS. 12 and 13 depict cross section views of the alternative embodiment of the valve position indicator 704 of FIG. 11. The alternate embodiment of valve position indicator 704 rests above actuator 708 on an indicator mounting surface 707. The valve position indicator 704 and/or indicator mounting surface 707 may be on any suitable location or side on the actuator 708, and may be mounted to the indicator mounting surface 707 with one or more bolts or other mounting or attachment means 703 (including threading, adhesives, snap-in, etc.). The valve position indicator 704 may include, but is not limited to, an indicator cover 706, light sources or LED lights 700, a LED mounting panel 701 and a mirror 702.

The indicator cover 706 may be dome shaped. Although the indicator cover 706 is shown as an arcuate dome it should be appreciated that the indicator cover 706 may have any suitable shape including cylindrical (inverted cup-shaped), conical, elliptical (any ellipse rotated about its central axis), geodesic domes and the like. Moreover, the indicator cover 706 is preferably substantially or partially transparent to allow light to pass through its surface.

The LED lights 700 are located beneath the indicator cover 706. The LED lights 700 may optionally be mounted on a LED mounting panel 701 that is adjacent or contiguous to the actuator 708 or indicator mounting surface 707 as depicted; alternatively, the LED lights 700 may be mounted on the actuator 708 or the indicator mounting surface 707 itself. As depicted in the exemplary embodiment shown, there are four LED lights 700 arranged in a circular or square-pattern on the LED mounting panel 701; however, it is to be understood that there may be any number of lighting sources possible. These LED lights 700 may be clear lights or colored lights (although for purposes of this disclosure clear may be considered a color such as a near white color or a blend of the colors of visible light), or lights capable of changing from one color to a different color, as desired by the operator to designate the status of a valve. Various different colored light(s) and options for different colors may be implemented. Additionally, in addition to the square arrangement of LED lights 700 depicted, the LED lights 700 may be in alternative arrangements, such as arranged into a circle or semi-circles, by way of example only. The LED lights 700 may be configured to illuminate no greater than one given color at any moment in time in response to the position of the valve 102. The LED lights 700 and usage may be further configured as discussed above with respect to FIGS. 2-10 including a row or array of LED lights 700 such that when valve 102 changes position between an open and closed position, the actuator shaft 108 or the like relays or communicates the change to the valve position indicator 704, and the position and/or direction of change is communicated by the color of the LED lights 600. As the actuator 708 is moving the LED lights 700 can sequentially and/or consecutively light to show/represent the amount and/or degree that the valve 102 is open. When the actuator 708 stops the LED lights may remain lit for any period of time including constant to show/represent the amount and/or degree that the valve 102 is open. The optional LED mounting panel 701 is preferably stationary.

The exemplary embodiment of valve position indicator 704 preferably includes a mirror 702. The mirror 702 may be centered within the indicator cover 706 and mounted internal, top-concentric 706a to the indicator cover 706. In one embodiment, the mirror 702 may have a substantially conical shape (inverted as shown) and include a top surface 702a, and a bottom surface 702b (with the bottom surface 702b defining the conical shape and in the embodiment of FIGS. 11-13 preferably defining a concave circumferential surface 710 as created by rotating a concave arc 710a around an axis normal to and centered on the LED mounting panel 701, the concave arc 710a running from the nose 712 to the base 714 of the mirror 702). The bottom surface 702b may be positioned above and directed towards or facing the LED lights 700. Further, the bottom surface 702b of the mirror 702 may be a reflective or polished surface such that the brightness of the LED lights 700 is reflected and/or amplified through the transparent or semi-transparent indicator cover 706 to increase visibility of the valve position indicator 704 from a distance. The concave circumferential surface 710 is defined to maximize visibility (considering that angle of incidence equals angle of reflection with respect to a line normal to the mirror; that curved mirrors can concentrate light such as in a telescope or solar cooker; and/or that an image of the LED light(s) 700 can be transformed and distorted through a curved mirror surface 710)) of the LED light(s) 700 to the viewer as reflected in mirror 702. The nose 712 of the mirror 702 may optionally contact the LED mounting panel 701.

Figure 14:
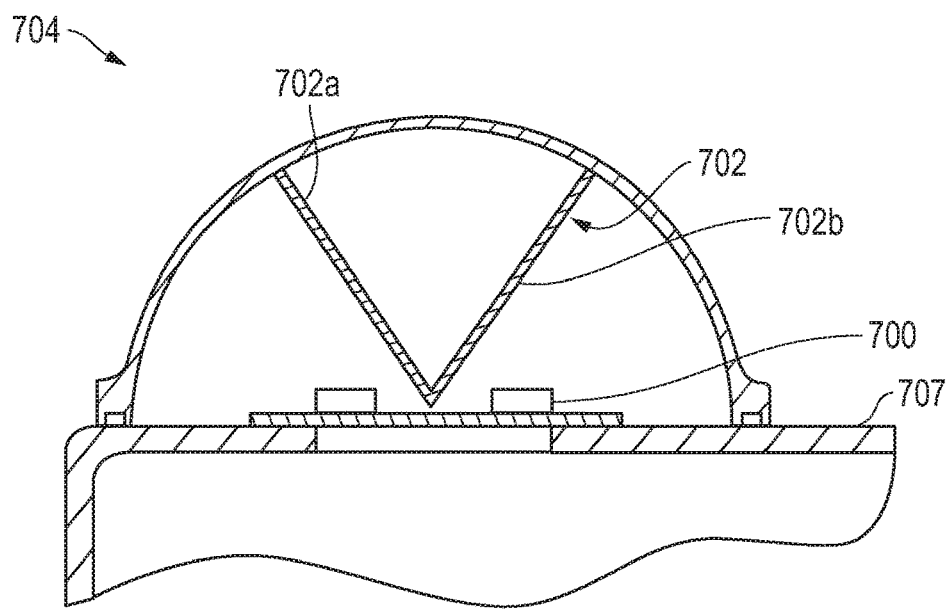
FIG. 14 depicts a cross section view of an alternative embodiment of the valve position indicator having a mirror.
Figure 15:
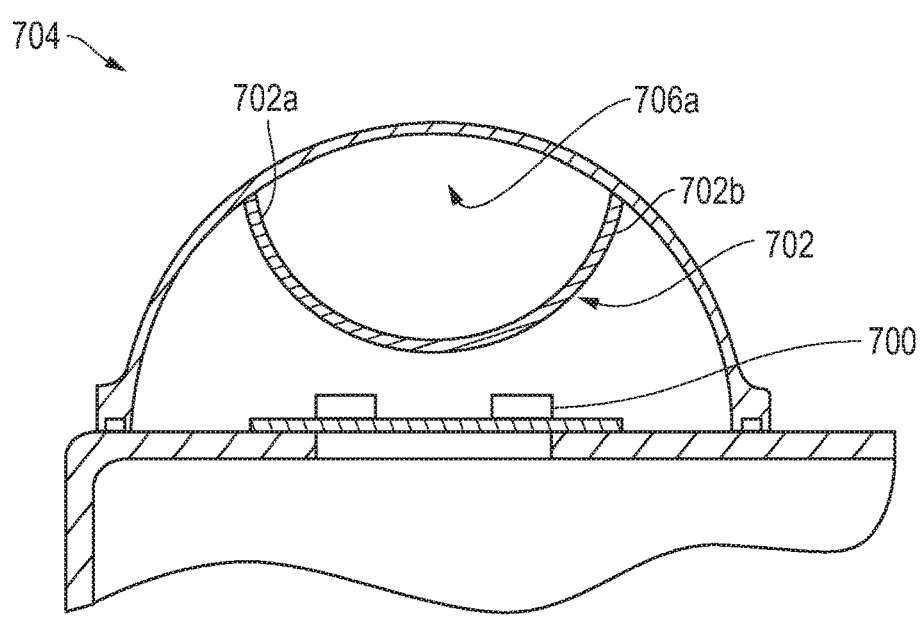
FIG. 15 depicts a cross section view of an alternative embodiment of the valve position indicator having a mirror.

Moreover, while the mirror 702 in FIGS. 11-13 are a curved conical shape, other mirror 702 shapes are possible, as depicted in, but not limited to FIGS. 14 and 15. FIG. 14 depicts an alternate embodiment of a valve position indicator 704 which has a mirror 702 in an inverted planar conical shape; and FIG. 15 depicts an alternate embodiment of a valve position indicator 704 wherein the mirror 702 has an upside-down dome shape.

Optionally, a protective layer (not shown) may be added to the reflective bottom surface 702b of the mirror 702 and such protective layer may optionally further serve to refract the light emitted from the LED light(s) 700. Optionally, the indicator cover 706 can serve and be designed to refract the light emitted from the LED lights 700 and/or reflected off the mirror 702.

Figure 16:
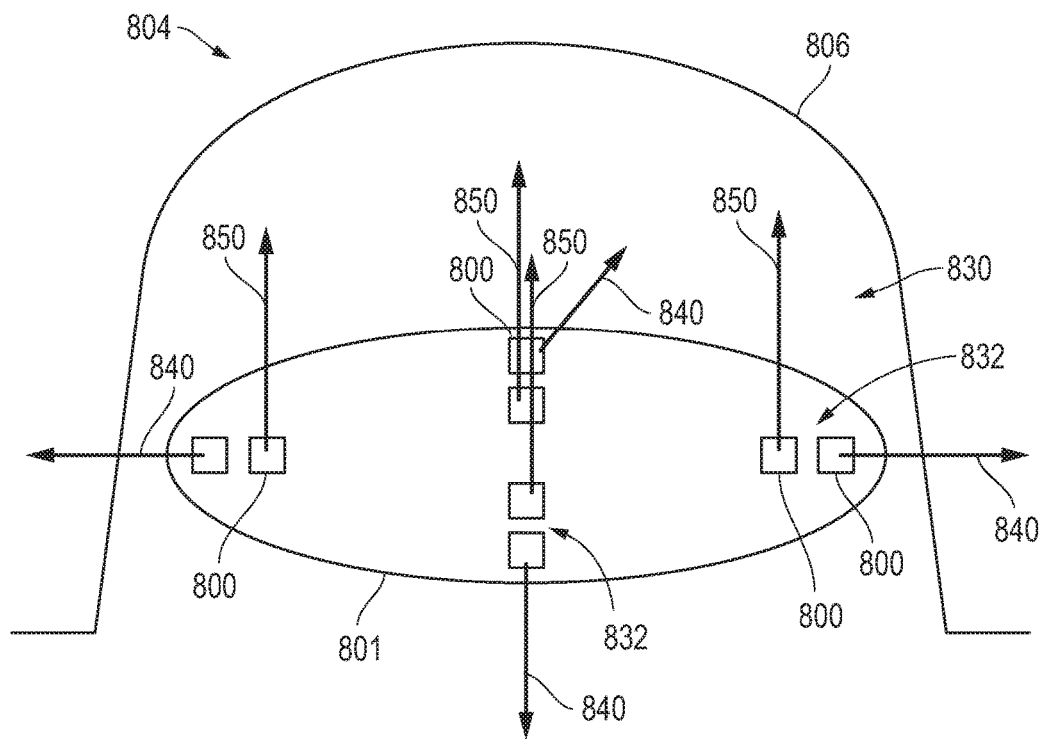
FIG. 16 depicts a perspective view of an alternative embodiment of a valve position indicator.

FIG. 16 depicts a perspective view of an alternative embodiment of a valve position indicator 804. The valve position indicator 804 may include, but is not limited to, an indicator cover 806, an array 830 of light sources or high intensity LED lights 800, and a LED mounting panel 801. In this alternative embodiment, the level of intensity of the light sources or high intensity LED lights 800 may depend on the ambient light. For example, if the ambient light is high or the room is bright, then the light sources or high intensity LED lights 800 will shine bright relative to the ambient light. If the ambient light is low or the room is dark, the light sources or high intensity LED lights 800 may not shine as brightly as if the ambient light were high; however, the light sources or high intensity LED lights 800 will shine bright relative to the low ambient light or dark room. A photo-sensor (not shown in FIG. 16) may detect the ambient light and control power input to the light sources or high intensity LED lights 800 accordingly. An array 830 of high intensity LED lights 800 are oriented on an LED mounting panel 801 such that a single point (or section or region or stack) 832 in the array 830 has one high intensity LED 800 oriented horizontally and one high intensity LED 800 oriented vertically. Both high intensity LED lights 800 at that single point/section/region/stack 832 are preferably lit at the same time. Each point/section/region/stack 832 of high intensity LED lights 800 may be spaced equiangular from each other point/section/region/stack 832 on then LED mounting panel 801 (by way of example only, there may be four points 832 having equiangular spacing around the array 830, although other numbers such as eight quadrants, for example, may be implemented). The LED array 830 is made of several LED points/sections/regions/stacks 832 such that when looking at the actuator either horizontally or vertically, a high intensity LED light 800 would be shining directly at the observer. The horizontal high intensity light beams 840 and the vertical high intensity light beams 850 coming from each high intensity LED light 800 at each point/section 832 of an array 830 are shown in FIG. 16 in this alternative embodiment. Optionally, this alternative embodiment may also include an inverted mirror, not shown in FIG. 16 but as represented in FIGS. 11-15 (e.g. mirror 702).

Figure 17:
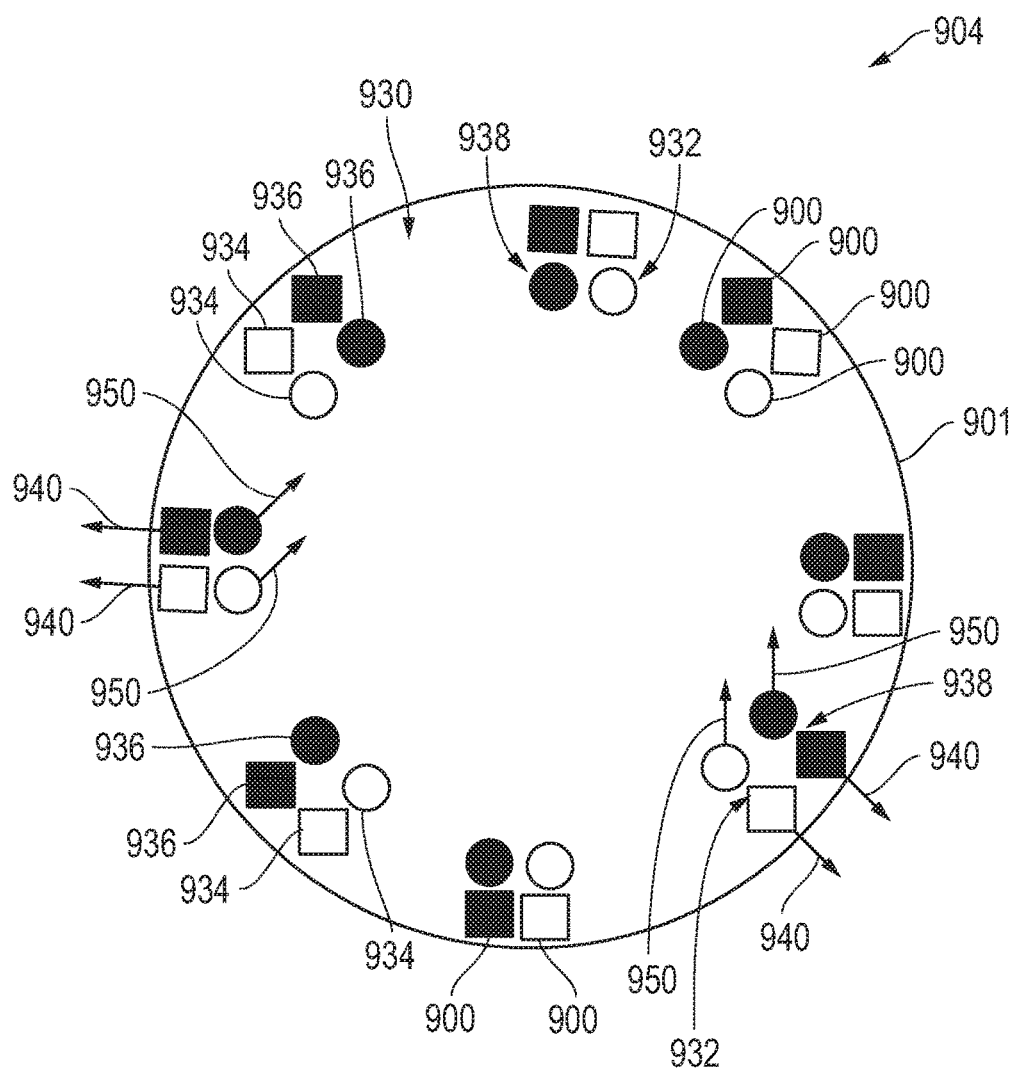
FIG. 17 depicts an above view schematic of an alternative embodiment of a valve position indicator.

FIG. 17 depicts an above view schematic of an alternative embodiment of a valve position indicator 904 (indicator cover 906 not shown). The valve position indicator 904 may include, but is not limited to, an indicator cover 906 (not shown in FIG. 17), an array 930 of light sources or high intensity LED lights 900, and a LED mounting panel 901. In this alternative embodiment, similar to the embodiment described for FIG. 16, the level of intensity of the light sources or high intensity LED lights 900 may depend on the ambient light. For example, if the ambient light is high or the room is bright, then the light sources or high intensity LED lights 900 will shine bright relative to the ambient light. If the ambient light is low or the room is dark, the light sources or high intensity LED lights 900 may not shine as brightly as if the ambient light were high; however, the light sources or high intensity LED lights 900 will shine bright relative to the low ambient light or dark room. A photo sensor (not shown in FIG. 17) may detect the ambient light and control power input to the light sources or high intensity LED lights 900 accordingly.

In this exemplary embodiment, an array 930 of high intensity LED lights 900 are oriented on an LED mounting panel 901 such that a single point (or section, quadrant, region or stack) 932 in the array has one high intensity LED oriented horizontally 940 and one high intensity LED oriented vertically 950. In this exemplary embodiment, eight points of high intensity LED lights 900 are mounted on the LED mounting panel 901. Each point/section/quadrant/region/stack 932 of high intensity LED lights 900 may be spaced equiangular from each other point/section/quadrant/region/stack 932 on then LED mounting panel 901 (by way of example only, as in this exemplary embodiment, there may be eight points 932 having equiangular or roughly equiangular spacing around the array 930). Additionally, in this embodiment, each pair of high intensity LED lights 900 at a single point (or section or region or stack) 932 is grouped or paired with another point 938 of high intensity LED lights 900 (sixteen total showing in FIG. 17 counting single points 932 and single points 938), one high intensity LED 900 of the point 932 and/or 938 oriented horizontally 940 and the other one high intensity LED 900 of the point 932 and/or 938 oriented vertically 950. While this embodiment shows thirty two high intensity LED lights 900 in total, more or fewer high intensity LED lights 900 may be used and more or fewer points 932 and/or grouped points 938 may be used.

Multicolor high intensity LED lights or any color high intensity LED lights 900 may be used, and by way of example, this embodiment utilizes green high intensity LED lights 934 and red high intensity LED lights 936. The high intensity LED lights may signify the position or status of the actuator. The red high intensity LED lights 936 may sequentially strobe clockwise to indicate a closing actuator. The green high intensity LED lights 934 may sequentially strobe counterclockwise to indicate an opening actuator. A fault condition may be indicated by simultaneously lighting the green high intensity LED lights 934 and the red high intensity LED lights 936, producing a yellow color. When the actuator reaches the open position, the green high intensity LED lights 934 may remain illuminated. When the actuator reaches the closed position, the red high intensity LED lights 936 may remain illuminated. The position of the actuator when in-between the respective open and closed positions may be indicated by the high intensity LED lights 900 using a flash code or pattern. By way of example only, a light flash pattern of "ON", "Pause", "Pause", "Pause" may indicate the valve 102 (see FIG. 1) is 25% open; a light flash pattern of "ON", "ON", "ON", "Pause" may indicate the valve 102 is 75% open; and a light flash pattern of "ON", "ON", "Pause", "Pause" may indicate the valve 102 is 50% open. These light flash codes or patterns, as well as strobe patterns and which high intensity LED lights remain illuminated, are offered as examples, and other patterns, sequences, or designations may be used to indicate the position of the actuator. Other actuator positions may be used in addition to or in place of 25%, 50%, and 75% valve 102 open or closed respectively. Optionally, this alternative embodiment may include an inverted mirror, not shown in FIG. 17 but as represented in FIGS. 11-15 (e.g. mirror 702).

While the embodiments are described with reference to various implementations and exploitations, it will be understood that these embodiments are illustrative and that the scope of the inventive subject matter is not limited to them. Many variations, modifications, additions and improvements are possible. For example, the implementations and techniques used herein may be applied to any one way valve in multiple types of piping systems, for example pump systems. Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. Applicant hereby incorporates by reference the related U.S. Provisional Application No. 61/721,123 filed Nov. 1, 2012.

The invention claimed is:

1. A valve comprising:
an actuator;
a valve position indicator coupled to the actuator, wherein the
valve position indicator comprises:
an indicator cover mounted over an indicator mounting surface;
a plurality of LED lights arranged on the indicator mounting surface;
a mirror mounted internal and concentric to the indicator cover; and
sensor in communicative connection with the actuator and the plurality of LED lights, wherein the sensor is configured to communicate the position of the valve to the plurality of LED lights.

2. The valve of claim 1, wherein said mirror has an inverted conical shape.

3. The valve of claim 1, wherein said mirror has a concave circumferential surface.

4. The valve of claim 1, wherein said mirror comprises a bottom reflective surface.

5. The valve of claim 1, wherein said mirror comprises a bottom reflective surface; and wherein said bottom reflective surface has a concave circumferential surface.

6. The valve of claim 1, wherein the plurality of LED lights are configured to illuminate a first color when the valve is changing in a direction of being opened, and a second color when the valve is changing in the direction of being closed.

7. The valve of claim 1, wherein the plurality of LED lights are configured to illuminate corresponding to an incremental position of the valve.

8. The valve of claim 1, wherein the plurality of LED lights each emit greater than one color.

9. The valve of claim 1, wherein the plurality of LED lights are all configured to illuminate a first color when the valve is closed, a second color when the valve is open, and a third color when the valve is transitioning between open and closed.

10. A valve comprising:
an actuator:
a valve position indicator coupled to the actuator wherein the valve position indicator comprises:
an indicator cover mounted over an indicator mounting surface;
a plurality of LED lights arranged on the indicator mounting surface;
wherein the plurality of LED lights appear in an array oriented into at least four single points on the array; wherein each of the four single points is spaced equiangular apart from each adjacent single point; wherein each single point comprises one high intensity LED oriented to emit light horizontally and one high intensity LED oriented to emit light vertically:
and
a sensor in communicative connection with the actuator and the plurality of LED lights, wherein the sensor is configured to communicate the position of the valve to the plurality of LED lights.

11. A valve position indicator, comprising:
an indicator cover being at least partially transparent;
a mirror located beneath the indicator cover, wherein the mirror has a reflective surface; and
a LED light located beneath the mirror, wherein the reflective surface of the mirror is facing the LED light.

12. A method for indicating a position of a valve in conjunction with a valve actuator, comprising the steps of:
sensing a position of the valve;
communicating the position of the valve to a plurality of LED lights; and
reflecting the illuminated LED lights from a conical mirror and through an indicator cover.

13. The method for indicating the position of the valve according to claim 12, further comprising the step of:
illuminating at least one of the plurality of LED lights to indicate an incremental degree that the valve is open, if any.

14. The method for indicating the position of the valve according to claim 12, further comprising the steps of:
illuminating the LED lights a first color when the valve is changing in a direction of being opened; and
illuminating the LED lights a second color when the valve is changing in the direction of being closed.

15. The method for indicating the position of the valve according to claim 12, further comprising the steps of:
illuminating the LED lights a first color when the valve is changing in a direction of being opened; and
illuminating the LED lights a second color when the valve is changing in the direction of being closed.

16. The method for indicating the position of the valve according to claim 12, wherein said step of reflecting the illuminated LED lights from the conical mirror comprises amplifying the brightness of the illuminated LED lights.

17. The method for indicating the position of the valve according to claim 12, wherein said step of reflecting the illuminated LED lights from the conical mirror comprises concentrating the light by reflecting the illuminated LED lights from a concave circumferential surface.

18. A method for indicating the position of a valve in conjunction with a valve actuator, comprising the steps of:
arranging the plurality of LED lights in an array oriented into at least four single points on the array, wherein each of the four single points is spaced equiangular apart from each adjacent single point;
sensing a position of the valve:
communicating the position of the valve to a plurality of LED lights: and beaming each single point as one high intensity LED emitting light horizontally and one high intensity LED contemporaneously emitting light vertically.

* * * * *